Nov. 1, 1932.   F. PICKARD   1,885,137
METHOD OF MAKING PILE WIRES
Filed March 9, 1929
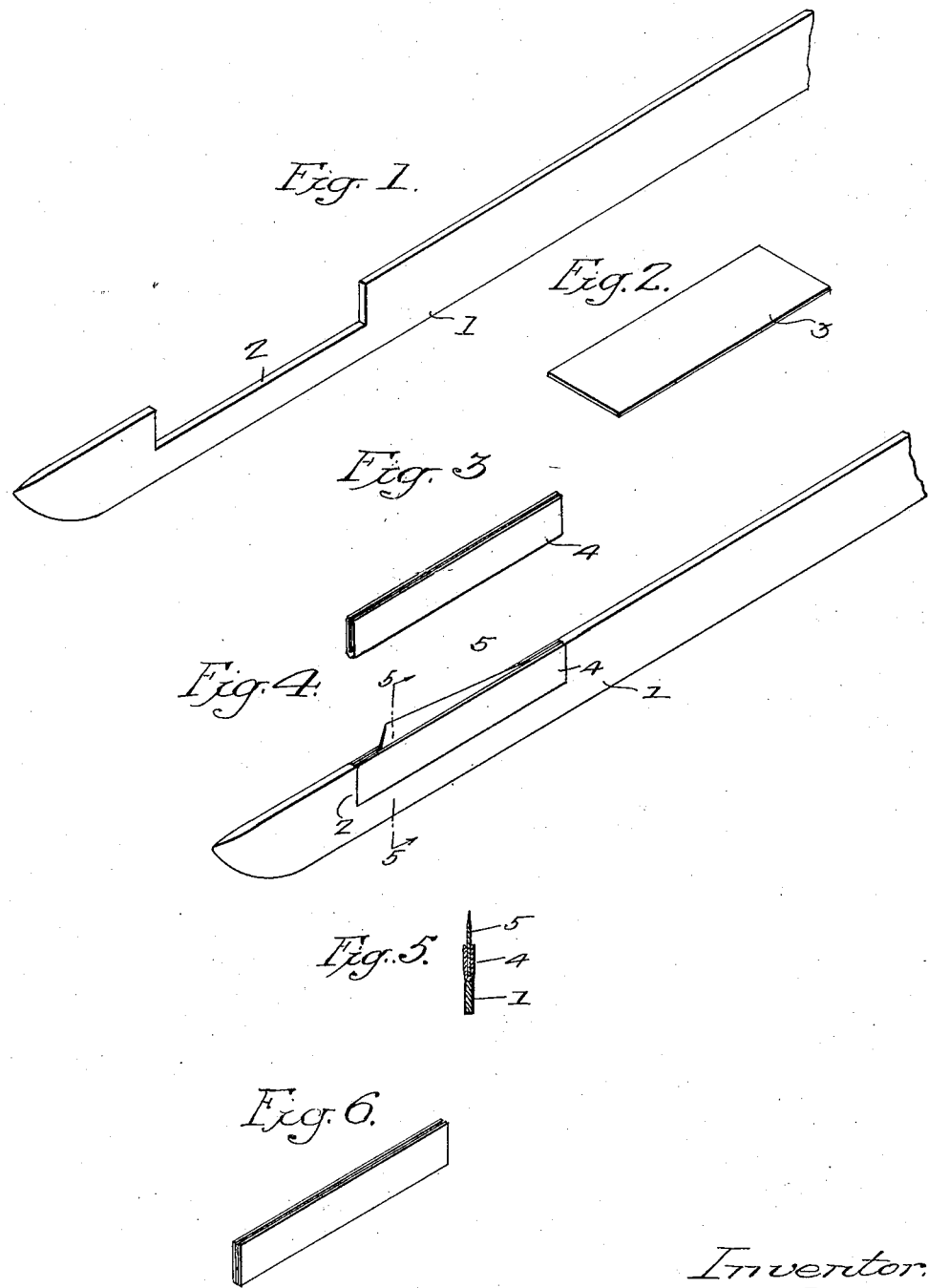

Patented Nov. 1, 1932

1,885,137

UNITED STATES PATENT OFFICE

FRED PICKARD, OF PHILADELPHIA, PENNSYLVANIA, ASSIGNOR TO JOSEPH PICKARD'S SONS CO., OF PHILADELPHIA, PENNSYLVANIA, A PARTNERSHIP COMPOSED OF OLIVER J. PICKARD, FRED PICKARD, AND FREDERICK A. ATKINSON

METHOD OF MAKING PILE WIRES

Application filed March 9, 1929. Serial No. 345,731.

This invention relates to improvements in pile wires of the type including a cutter blade which functions to cut the pile loops.

More specifically, the invention relates to that type of wire utilizing a separately formed blade mounted in a slot formed in the upper edge of the wire, and the principal object of the invention is to simplify and cheapen the cost of manufacture of this type of wire.

Heretofore, the slots for reception of the blade have been formed by a machining operation which, by reason of the extreme thinness of the wire, is a delicate one, requiring great care and accuracy, such machining being relatively expensive and constituting the item of greatest cost in production.

I have discovered whereby this costly machining operation may be eliminated, while at the same time producing a wire which in all essential respects is the equal or superior of the wires made in accordance with the prior practice.

In the attached drawing:

Figure 1 is a view of a portion of a pile wire illustrating the initial step in the production of the completed article;

Fig. 2 is a view of the blank from which the slot-containing element is formed;

Fig. 3 is a view of the formed slot element;

Fig. 4 is a perspective view of the end of the finished wire showing the cutting blade in position;

Fig. 5 is a section on the line 5—5, Fig. 4, and

Fig. 6 is a view in perspective showing a modified form of slotted member.

In producing a pile wire in accordance with my invention, I may first form a blank wire 1 having at one end and in the upper edge a recess 2. I then take a metal strip 3 which in thickness is approximately one-half of the thickness of the pile wire 1, and by suitable means bend this strip longitudinally to form a slotted element 4, as shown in Fig. 3, this slot corresponding in thickness substantially with the blade 1. This formed slot element 4 has approximately the same dimensions as the recess 2 so that it may readily be inserted in said recess in which it is then secured by means of brazing, soldering or welding. When so assembled in the wire, the element 4 provides a slot in which may be inserted and suitably secured by any of the known methods a cutter blade 5.

It will be apparent that when this cutter blade is inserted, there will be a tendency to force the sides of the slot-forming element outwardly to a slight extent beyond the side surfaces of the wire 1, as shown in Fig. 5. Obviously, by using a blank strip 3 somewhat lesser in thickness than one-half the thickness of the pile wire 1, the slot element 4 may be formed which, when the blade is inserted, will be of exactly the same thickness as the wire 1. It is desirable to form the article as illustrated so that there may be a slight projection of the slotted portion beyond the side surfaces of the wire, since this has a tendency to expand and tighten the loops as they pass to the blade 5, thereby creating a tension in the loop which aids the cutting operation and insures a greater uniformity in the height of the pile.

It will be apparent that the wire is formed without special machining operation and with the addition over the usual practice of a simple brazing or welding operation which is relatively simple and cheap. The finished product is in all respects equal in durability to the wires as made in accordance with the prior practice, and has the added feature of the increased width around the blade which functions as set forth above to place the pile loops under tension during the cutting operation.

There may be modification of the aforedescribed embodiment without departure from the invention. The slot element, for example, may be made by uniting two separate side plates with an intermediate spacer, as shown in Fig. 6, and in other ways; or the slotted member might be formed to constitute the entire extremity of the wire and be secured to the body of the wire by a butt weld.

I claim:

The method of forming a pile wire, which consists in forming a blank wire having a recess in its upper edge terminating intermediate the ends of the wire, bending a strip of sheet metal upon itself to form a slotted element corresponding substantially with the dimensions of the recess and the thickness of the said blank, securing the slotted element in the recess whereby a socket is formed for reception of a cutting blade, and forcing said cutting blade into said recess to expand the walls thereof beyond the plane of the walls of the blank.

FRED PICKARD.